United States Patent
Ishizuka

(10) Patent No.: US 8,961,361 B2
(45) Date of Patent: Feb. 24, 2015

(54) WHEEL DRIVE UNIT

(71) Applicant: Sumitomo Heavy Industries, Ltd., Tokyo (JP)

(72) Inventor: Masayuki Ishizuka, Kanagawa (JP)

(73) Assignee: Sumitomo Heavy Industries, Ltd., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/078,136

(22) Filed: Nov. 12, 2013

(65) Prior Publication Data

US 2014/0135164 A1 May 15, 2014

(30) Foreign Application Priority Data

Nov. 14, 2012 (JP) ................................. 2012-250544

(51) Int. Cl.
*F16H 57/08* (2006.01)
*B60K 17/04* (2006.01)

(52) U.S. Cl.
CPC .............. *F16H 57/08* (2013.01); *B60K 17/046* (2013.01)
USPC ........... 475/331; 475/159; 475/160; 475/162; 475/169; 475/176; 475/177; 180/65.51; 180/65.6; 180/65.7; 180/184; 384/585; 384/565; 384/563

(58) Field of Classification Search
None
See application file for complete search history.

(56) References Cited

U.S. PATENT DOCUMENTS

| | | | | |
|---|---|---|---|---|
| 4,649,772 | A * | 3/1987 | Daniel et al. ................... | 475/331 |
| 7,314,256 | B1 * | 1/2008 | Haines ......................... | 301/108.5 |
| 2005/0105840 | A1 * | 5/2005 | Muranaka et al. ............. | 384/544 |
| 2009/0000840 | A1 * | 1/2009 | Murata ......................... | 180/65.5 |
| 2011/0000394 | A1 * | 1/2011 | Miki et al. ..................... | 105/96 |
| 2011/0130238 | A1 * | 6/2011 | Schoon .......................... | 475/154 |

FOREIGN PATENT DOCUMENTS

| DE | 19911458 A1 | 10/1999 |
|---|---|---|
| WO | 00/36317 A1 | 6/2000 |

OTHER PUBLICATIONS

Extended European Search Report in counterpart European Patent Application No. 13004889.5 dated Feb. 17, 2014 (5 pages).

* cited by examiner

*Primary Examiner* — Stefanos Karmis
*Assistant Examiner* — David Morris
(74) *Attorney, Agent, or Firm* — Buchanan Ingersoll & Rooney PC

(57) ABSTRACT

A wheel drive unit includes: a planetary gear mechanism including a planetary gear and an internally-toothed gear; a casing integrated with the internally-toothed gear, a wheel being attached to the casing, and the casing transmitting rotation of the internally-toothed gear to the wheel; a bearing nut configured to prevent axial movement of the casing; and an oil seal provided more toward an interior of a vehicle than the planetary gear mechanism and axially fixed with respect to the casing. An inner diameter of the detachment prevention member is smaller than an outer diameter of the externally-toothed gear.

9 Claims, 2 Drawing Sheets

(prior art)

WHEEL DRIVE UNIT

Priority is claimed to Japanese Patent Application No. 2012-250544, filed Nov. 14, 2012, the entire content of which is incorporated herein by reference.

BACKGROUND OF THE INVENTION

1. Field of the Invention

The present invention relates to a wheel drive unit to drive wheels of a utility vehicle.

2. Description of the Related Art

Wheel drive units for driving wheels of a utility vehicle such as a forklift in which a reducer mechanism is built are known. Some wheel drive units having such a structure are configured such that a wheel hub to which a tire is attached is arranged outside the reducer mechanism. FIG. 1 is a cross sectional view of the wheel drive unit described in WO00/36317. As seen from the FIG. 1, a planetary gear mechanism C embodying a reducer and a disk brake 6 are accommodated in a housing 9 of the unit. A wheel (not shown) is tightened by bolts A to a hub 12 located toward the exterior of the vehicle. The hub 12 is joined to the unit via a spline formed on the inner circumference of an output carrier 11 and is axially fixed by a bolt B.

SUMMARY OF THE INVENTION

The wheel drive unit according to one embodiment of the present invention includes: a planetary gear mechanism including a planetary gear and an internally-toothed gear; a casing integrated with the internally-toothed gear, a wheel being attached to the casing, and the casing transmitting the rotation of the internally-toothed gear to the wheel; a movement restriction member configured to restrict axial movement of the casing; and a detachment prevention member provided more toward an interior of a vehicle than the planetary gear mechanism and axially fixed with respect the casing, wherein an inner diameter of the detachment prevention member is smaller than an outer diameter of the planetary gear.

According to the embodiment, a detachment prevention member having an inner diameter smaller than an outer diameter of the planetary gear is provided more toward an interior of a vehicle than the planetary gear mechanism. Therefore, even when the movement restriction member becomes loose and the function thereof to prevent movement is lost, detachment of the casing from the wheel drive unit is prevented due to contact of the detachment prevention member more toward the vehicle with the planetary gear.

The planetary gear mechanism may be of eccentric oscillation and meshing type or simple type. In the case of eccentric oscillation and meshing type, "a diameter of the planetary gear" means an outermost diameter (addendum circle) of the externally-toothed gear oscillating within a plane defined about a central axis normal to the plane. In the case of simple type, the phrase refers to an outer diameter of a circle connecting points located on two or more planet gears rotated around the sun gear that are farthest from the central axis of the sun gear (points located on the addendums of the planet gears that are farthest from the center of the sun gear).

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

When a bolt connecting the hub and the rotating housing of the related-art wheel drive unit becomes loose, the hub might be detached from the wheel drive unit along with the wheel.

Embodiments of the present invention address a need to provide a structure of a wheel drive unit capable of preventing the casing from being detached from the wheel drive unit even when the member for preventing the axial movement of the casing to which the wheel is attached becomes loose.

Figure 1:
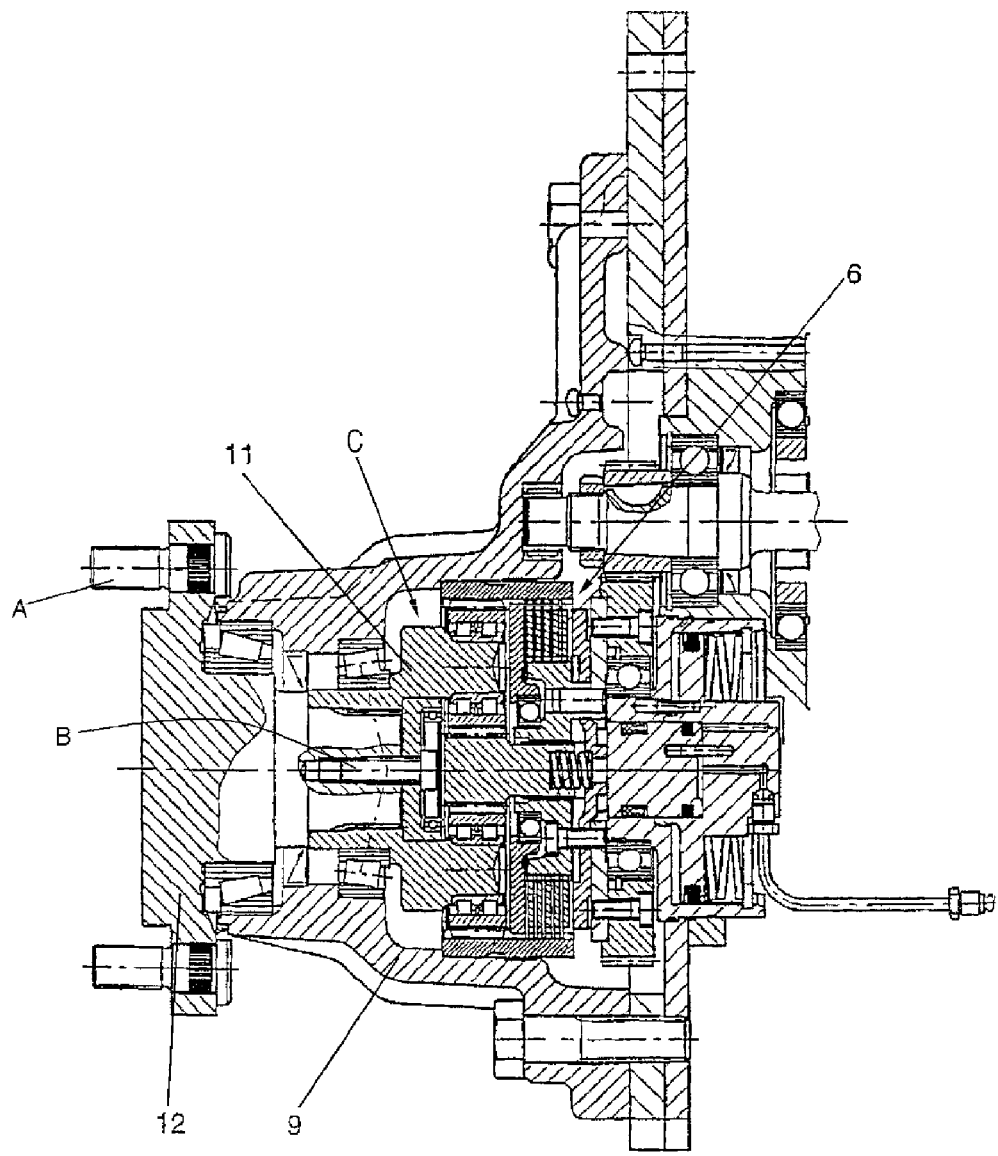
FIG. 1 is a cross sectional view of a wheel drive unit according to the related art.
Figure 2:
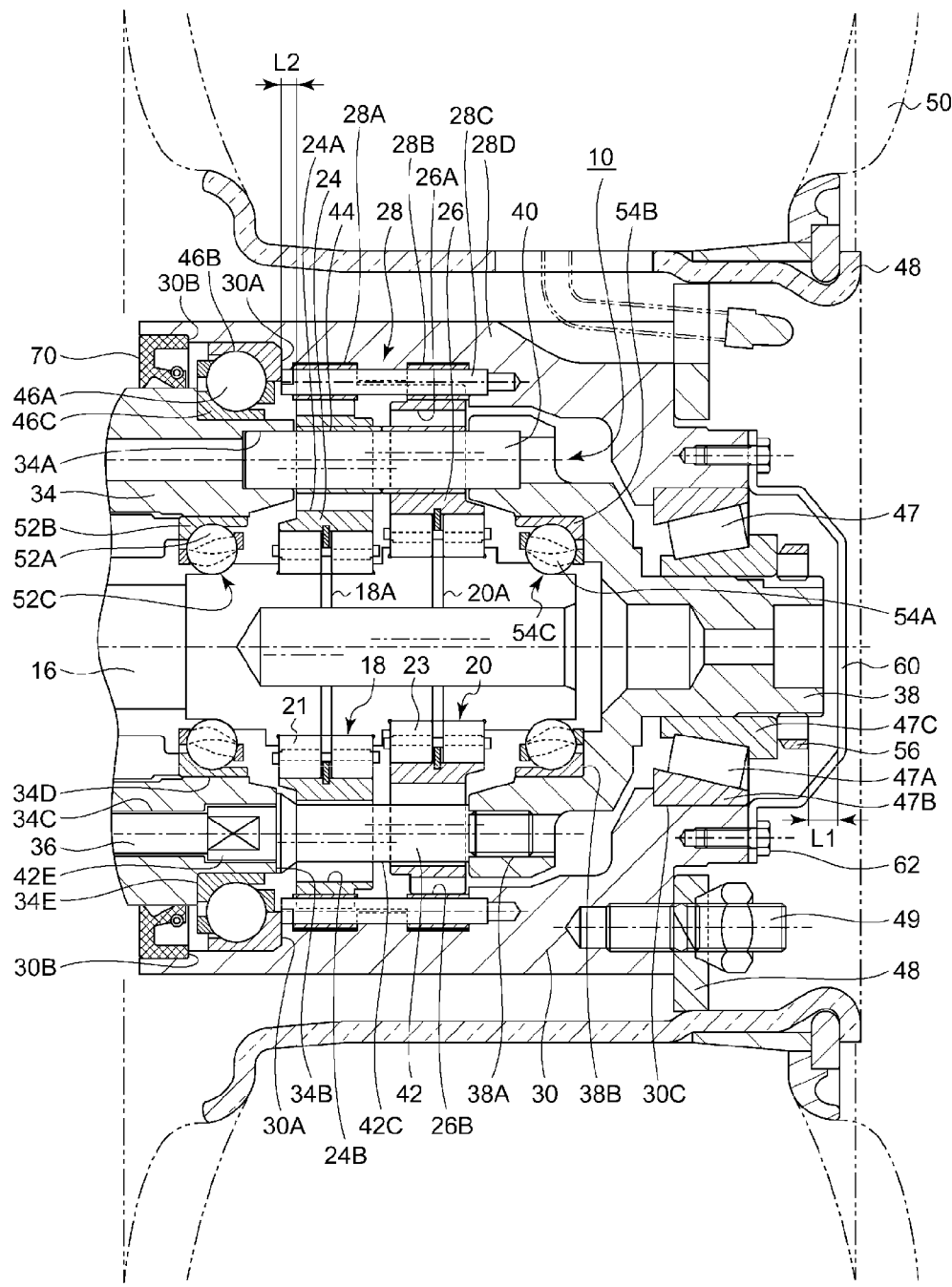
FIG. 2 is a cross sectional view showing the configuration of the wheel drive unit according to an embodiment of the present invention.

FIG. 2 is a cross sectional view that results when the wheel drive unit 100 according to an embodiment of the present invention is severed by a vertical plane that includes the central axis. The wheel drive unit 100 may be used in a utility vehicle such as a forklift.

The wheel drive unit 100 includes a reducer 10, which is a kind of planetary gear mechanism of eccentric oscillation and meshing type, and a motor (not shown) connected to the reducer 10 in the left of FIG. 2, i.e., toward the interior of the vehicle.

The output shaft of the motor is joined to an input shaft 16 of the reducer 10 via a spline (not shown). The input shaft 16 is located at the radial center of externally-toothed gears 24 and 26 described later. Two eccentric bodies 18 and 20 eccentric relative to the input shaft 16 are formed so as to be integrated with the input shaft 16. The two eccentric bodies 18 and 20 are eccentric relative to each other by a phase difference of 180°. Channels 18A and 20A for supplying lubricant to roller bearings 21 and 23 are formed in the input shaft 16. The eccentric bodies 18 and 20 may be configured as components independent of the input shaft 16 and fixed to the input shaft using a key, etc.

Two externally-toothed gears 24 and 26 are oscillatably fitted to the outer circumference of the eccentric bodies 18 and 20, respectively, via roller bearings 21 and 23. The externally-toothed gears 24 and 26 internally mesh with internally-toothed gear 28.

The internally-toothed gear 28 primarily includes cylindrical internal gear pins (also referred to as external rollers) 28A and 28B forming internally-toothed gears and configured to promote sliding motion, an external pin (also referred to as a retention pin) 28C extending through the internal gear pins 28A and 28B and rotatably retaining the internal gear pins 28A and 28B, and an internally-toothed gear body 28D rotatably retaining the external pin 28C and integrated with the inner circumferential surface of a casing 30. The external pin may be supported by the casing 30 so as not to be rotatable.

The number of internal teeth of the internally-toothed gear 28, i.e., the number of each of the internal gear pins 28A and 28B, is slightly (in this case, by one) larger than the number of external teeth of each of the externally-toothed gears 24 and 26.

A first carrier body 34 fixed to a vehicle frame (not shown) is located at the axial end of the externally-toothed gears 24 and 26 toward the vehicle (toward the interior of the vehicle). At the axial end of the externally-toothed gears 24 and 26 away from the vehicle (toward the exterior of the vehicle) is located a second carrier body 38 integrated with the first carrier body 34 via carrier bolts 36 and carrier pins 42. Internal pins 40 are formed to be integrated with the second carrier body 38.

Twelve through holes having the equal radius are formed at positions in the externally-toothed gear 24 offset from the shaft center so as to be equidistant from each other (the externally-toothed gear 26 is configured similarly, although not shown). The carrier pins 42 are inserted through three of these through holes equidistant from each other by 120°, and internal pins 40 are inserted through the remaining nine holes. Therefore, the three holes will be referred to as carrier pin holes 24B, and the nine holes will be referred to as internal pin holes 24A. However, the carrier pin holes 24B and the internal pin holes 24A are not different in their shape and radial position. Gear teeth of waveform are formed on the outer circumference of the externally-toothed gear 24. As the gear teeth move on the internal gear pins 28A of the internally-toothed gear 28, maintaining contact with the internal gear pins 28A, the externally-toothed gear 24 is capable of oscillating within a plane defined about a central axis normal to the plane. The externally-toothed gear 26 is similarly structured (not shown) except that there is a phase difference of 180° to the externally-toothed gear 24.

The internal pins 40 are inserted through the internal pin holes 24A and 26A formed through the externally-toothed gears 24 and 26, creating a gap between the internal pins 40 and the internal pin holes 24A and 26A. The ends of the internal pins 40 are fitted in recesses 34A of the first carrier body 34. The internal pins 40 are in contact with parts of the internal pin holes 24A and 26A formed in the externally-toothed gears 24 and 26 via sliding motion promoting members 44. The internal pins 40 prevent the rotation of the externally-toothed gears 24 and 26 and permit only the oscillation thereof.

The internal pins 40 are merely press-fitted in the recesses 34A and are not bolted, etc. The internal pins can be said to be joint members contributing to transmission of power between the first and second carrier bodies 34 and 38 and the externally-toothed gears 24 and 26.

The carrier pins 42 are inserted through the carrier pin holes 24B and 26B formed through the externally-toothed gears 24 and 26, creating a gap between the carrier pins 42 and the carrier pin holes 24B and 26B. Contact portions 42C of the carrier pins 42 with an enlarged diameter are in contact with the surface of the first carrier body 34 away the vehicle. The carrier pins 42 and the first carrier body 34 are tightened to each other by carrier bolts 36. The first carrier body 34 is formed with through holes 34C for guiding the carrier bolts 36 and spot facings 34B. The axial end faces of the carrier pins 42 are formed with screw holes 42E for receiving the carrier bolts 36. Female screw holes 38A are formed in the second carrier body 38. The female screw holes 38A are coupled to male screws at the ends of the carrier pins 42 away from the vehicle so that the carrier pins 42 and the second carrier body 38 are tightened to each other.

The carrier pins 42 are not in contact with the carrier pin holes 24B and 26B of the externally-toothed gears 24 and 26 and so do not contribute to prevention of the rotation of the externally-toothed gears 24 and 26. The carrier pins 42 can be said to be joint members contributing only to joint between the first carrier body 34 and the second carrier body 38.

The casing 30 of the reducer 10 is substantially cylindrically shaped. A first main bearing 46 is fitted in a recess 30A formed on the inner circumference of the casing 30 toward the interior of the vehicle. The casing 30 is rotatably supported on the outer circumference of the first carrier body 34 via the first main bearing 46. A flange extending radially inward is formed in the casing 30 more toward the exterior of the vehicle than the externally-toothed gears 24 and 26. A second main bearing 47 is fitted in a recess 30C formed on the inner circumference of the flange. The casing 30 is rotatably supported on the outer circumference of the second carrier body 38 via the second main bearing 47. The first and second main bearings 46 and 47 may be press-fitted into the casing 30. Alternatively, the first and second main bearings 46 and 47 may be fitted in the casing 30, creating a gap, and then fixed to the casing 30 by a stopper ring (not shown). In other words, the first and second main bearings 46 and 47 need only be fixed in the axial direction with respect to the casing 30.

A wheel 48 is joined via bolts 49 to the end surface of the casing 30 away from the vehicle. A tire 50 of a forklift (not shown) is mounted to the wheel 48. The reducer 10 is accommodated within an axial range of the tire 50 (within the range denoted by a dashed two dotted line of FIG. 2).

A bearing nut 56 is screwed into the threaded portion formed on the outer circumferential surface of the second carrier body 38. An inner race 47C of the second main bearing 47 is in contact with the left end face of the bearing nut 56, and an outer race 47B of the second main bearing 47 is in contact with the recess 30C of the casing 30. An outer race 46B of the first main bearing 46 is in contact with the recess 30A of the casing 30, and an inner race 46C of first main bearing 46 is in contact with a shoulder part 34E formed in the first carrier body 34. As a result, axial movement of the casing 30 in which the first and second main bearings 46 and 47 are fitted is prevented by the bearing nut 56.

By modifying the amount by which the bearing nut 56 is pushed when the second carrier body 38, the casing 30, and the main bearings 46 and 47 are assembled, the preload given to the main bearings 46 and 47 can be controlled.

A cover 60 covering the bearing nut from outside is attached by bolts 62 to the end face of the casing 30 further away from the vehicle than the bearing nut 56.

An oil seal 70 for sealing the gap between the inner circumference of the casing 30 and the outer circumferential surface of the first carrier body 34 is provided more toward the interior of the vehicle than the first main bearing 46. The oil seal 70 is fitted (press-fitted) into a recess 30B formed on the inner circumference of the casing 30 such that a rip of the oil seal is contact with the outer circumferential surface of the first carrier body 34.

The input shaft 16 (input member) of the reducer 10 is rotatably supported by the first carrier body 34 and the second carrier body 38 via a pair of angular contact ball bearings 52 and 54 in face-to-face arrangement. The angular contact ball bearings 52 and 54 have rolling elements 52A and 54A, and outer races 52B and 54B, respectively. However, the angular contact ball bearings do not have inner races. Instead, rolling surfaces 52C and 54C are formed in the input shaft 16 and function as inner races of the angular contact ball bearings. The above-described configuration is non-limiting, and separate inner races may be provided.

Referring to FIG. 2, axial movement of the angular contact ball bearing 52 located to the left of the externally-toothed gear 24 is prevented by a recess 34D formed in the first carrier body 34 and the rolling surface 52C of the input shaft 16. Axial movement of the angular contact ball bearing 54 away from the vehicle is prevented by a recess 38B formed in the second carrier body 38 and the rolling surface 54C of the input shaft 16. Therefore, axial movement of the input shaft 16 is prevented in both directions by the first carrier body 34 and the second carrier body 38 and so is positioned in the axial direction without play.

A description will now be given of the action of the wheel drive unit 100.

The rotation of the output shaft of the motor (not shown) is transmitted to the input shaft 16 of the reducer 10 via the spline. When the input shaft 16 is rotated, the outer circumferences of the eccentric bodies 18 and 20 move eccentrically, causing the externally-toothed gears 24 and 26 to oscillate via the roller bearings 21 and 23. The oscillation causes the positions of meshing between the outer teeth of the externally-toothed gears 24, 26 and the internal gear pins 28A, 28B of the internally-toothed gear 28, respectively, to be shifted successively.

The difference in the number of teeth between the externally-toothed gears 24, 26 and the internally-toothed gear 28 is defined to be "1". Further, the rotation of the externally-toothed gears 24 and 26 is prevented by the internal pins 40 fixed to the first carrier body 34, which is fixed to the vehicle frame. Therefore, each time the input shaft 16 is rotated 360°, the internally-toothed gear 28 is rotated relative to the externally-toothed gears 24 and 26, the rotation of which is prevented, by an angle defined by the difference in the number of teeth. As a result, the rotation of the input shaft 16 causes the casing 30 integrated with the internally-toothed gear body 28D to be rotated at a rotational speed reduced by 1/(the number of teeth of the internally-toothed gear). The rotation of the casing 30 causes the tire 50 of the forklift to be rotated via the wheel 48 fixed to the casing 30 by the bolts 49.

As described above, axial movement of the casing 30 of the wheel drive unit 100 according to the embodiment is prevented by the bearing nut 56. When the inner race 47C of the second main bearing 47 in such a structure is fitted to the second carrier body 38 so as to create a gap, if the bearing nut 56 becomes loose for some reason, the casing 30 might be moved axially outward with respect to the second carrier body 38 so as to be detached from the wheel drive unit.

This is prevented in the embodiment by allowing the first main bearing 46 and the oil seal 70 located opposite to the bearing nut 56 across the reducer 10 to function as a detachment prevention member for preventing detachment of the casing 30. More specifically, the inner diameter of the outer race 46B of the main bearing 46 fitted to the inner circumference of the casing 30 is configured to be smaller than the outer diameter (addendum circle) of the externally-toothed gear 24 and/or configuring the inner diameter of the oil seal 70 fitted to the inner circumference of the casing 30 to be smaller than the outer diameter of the externally-toothed gear 24.

If the bearing nut 56 becomes loose and the function of preventing axial movement of the casing 30 is lost in this structure, contact between the outer race 46B of the first main bearing 46 or the oil seal 70 with the externally-toothed gear 24 prevents further movement of the casing 30 away from the vehicle. Accordingly, detachment of the casing 30 is prevented.

The first main bearing may be implemented by a roller bearing of a structure in which a rolling element 46A is press-fitted into the rail of the outer race 46B. In this case, axial movement of the rolling element 46A with respect to the outer race 46B is prevented. Therefore, detachment of the casing 30 is prevented if the inner diameter of the rolling element 46A is smaller than the outer diameter of the externally-toothed gear 24. The first main bearing 46 may be a roller bearing instead of a ball bearing.

Further, in place of the first main bearing 40 and the oil seal 70, or in addition to the first main bearing 40 and the oil seal 70, an annular member dedicated to prevention of detachment may be engaged with the inner circumference of the casing 30 toward the interior of the vehicle so as to be adjacent to the bearing or the oil seal.

It is preferable that a distance L2 between the outer race 46B of the first main bearing 46 and the surface of the externally-toothed gear 24 axially adjacent to the outer race 46B is smaller than a distance L1 between the bearing nut 56 and the surface of the cover 60 axially adjacent to the bearing nut 56. Normally, the bearing outer race and the externally-toothed gear are formed of a material harder than that of the bearing nut or the cover. For this reason, contact between the outer race 46B and the externally-toothed gear 24 occurs before contact between the bearing nut 56 and the cover 60, when the bearing nut 56 becomes loose and the casing 30 is moved away from the vehicle accordingly. Therefore, abrasion due to contact is reduced.

As described above, the wheel drive unit according to the embodiment including a casing to which a wheel is tightened is configured such that a detachment prevention member axially fixed with respect to the casing is provided on the inner circumference of the casing opposite to the bearing nut for preventing axial movement of the casing and across the planetary gear mechanism embodying the reducer. For this reason, even when the bearing nut positioned toward the exterior of the vehicle becomes loose, detachment of the casing is prevented due to contact of the detachment prevention member toward the interior of the vehicle with the externally-toothed gear of the reducer.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The planetary gear reducer for a wheel drive unit of eccentric oscillation and meshing type in which the input shaft (eccentric body shaft) 16 is provided at the center of the internally-toothed gear 28 is described by way of example. However, the reducer may not be of this type. For example, invention may be applied to wheel drive units provided with any type of planetary gear reducer (e.g., a planetary gear reducer of eccentric oscillation type in which a plurality of eccentric body shafts are arranged at positions offset from the center of the internally-toothed gear, or a planetary gear reducer of simple planetary type).

Control of preload on the angular contact ball bearing fitted to the input shaft is described by way of example. However, the bearing fitted to the power transmission shaft may not be an angular contact ball bearing but may be a bearing capable of supporting radial load or axial load, i.e., a bearing that requires application of a preload. For example, a taper-rolling bearing may serve the purpose.

A forklift is described by way of example of a utility vehicle driven by the wheel drive unit. However, the invention is applicable to any utility vehicle. For example, the invention is applicable to utility vehicles capable of carrying machinery for construction, civil engineering, or transportation.

What is claimed is:

1. A wheel drive unit for a vehicle, the wheel drive unit comprising:
   a planetary gear mechanism including a planetary gear and an internally-toothed gear;
   a casing integrated with the internally-toothed gear, a wheel being attached to the casing, and the casing transmitting rotation of the internally-toothed gear to the wheel;

a movement restriction member configured to restrict axial movement of the casing; and a detachment prevention member provided more toward an interior of the vehicle than the planetary gear mechanism and fitted to an inner circumference of the casing to be axially fixed with respect the casing, wherein an inner diameter of the detachment prevention member is smaller than an outer diameter of the planetary gear, and an inner diameter of the casing is larger than the outer diameter of the planetary gear in a region of the casing that is more toward the interior of the vehicle than the planetary gear.

2. The wheel drive unit according to claim 1, further comprising:

pin members inserted through the planetary gear, a carrier body having the pin members, and a first bearing disposed between the casing and the carrier body, wherein the detachment prevention member is an outer race of the first bearing.

3. The wheel drive unit according to claim 2, wherein an input shaft of the planetary gear mechanism is supported to the carrier body via a bearing.

4. The wheel drive unit according to claim 1, further comprising:

pin members inserted through the planetary gear, a carrier body having the pin members, and a first bearing disposed between the casing and the carrier body, wherein the detachment prevention member is a rolling element axially fixed to an outer race of the first bearing.

5. The wheel drive unit according to claim 4, wherein an input shaft of the planetary gear mechanism is supported to the carrier body via a bearing.

6. The wheel drive unit according to claim 1, wherein the detachment prevention member is an oil seal fitted to the inner circumference of the casing.

7. The wheel drive unit according to claim 1, wherein the movement restriction member is a bearing nut configured to apply a preload to a bearing provided on the inner circumference of the casing more toward the exterior of the vehicle than the planetary gear mechanism.

8. The wheel drive unit according to claim 7, further comprising:

a cover provided more toward the exterior of the vehicle than the bearing nut and configured to cover the bearing nut, wherein a distance between the detachment prevention member and a surface of the planetary gear axially adjacent to the detachment prevention member is smaller than a distance between the bearing nut and a surface of the cover axially adjacent to the bearing nut.

9. The wheel drive unit according to claim 1, further comprising:

pin members inserted through the planetary gear;

a carrier body having the pin members;

a first bearing disposed between the casing and the carrier body more toward the interior of the vehicle than the planetary gear mechanism; and a second bearing disposed between the casing and the carrier body more toward the exterior of the vehicle than the planetary gear mechanism, wherein an outer diameter of the second bearing is smaller than an outer diameter of the first bearing.

* * * * *